United States Patent [19]
Nakayama et al.

[11] 3,849,250
[45] Nov. 19, 1974

[54] PROCESS FOR PRODUCING L-ARGININE BY FERMENTATION

[75] Inventors: Kiyoshi Nakayama, Sagamihara; Hajime Yoshida, Tokyo, both of Japan

[73] Assignee: Kyowa Hakko Kogyo Kabushiki Kaisha, Chiyoda-ku, Tokyo, Japan

[22] Filed: Jan. 16, 1973

[21] Appl. No.: 324,033

Related U.S. Application Data

[63] Continuation-in-part of Ser. No. 119,348, Feb. 26, 1971, abandoned.

[52] U.S. Cl............................ 195/29, 195/30, 195/47
[51] Int. Cl............................................. C12d 13/06
[58] Field of Search ..................... 195/28, 29, 30, 47

[56] References Cited
UNITED STATES PATENTS

| | | | |
|---|---|---|---|
| 3,222,258 | 12/1965 | Iizuka et al. ........................... | 195/29 |
| 3,440,141 | 8/1969 | Douros et al. ...................... | 195/28 R |

OTHER PUBLICATIONS

Udaka et al., J. Bact., Vol. 91, p. 617–621, (1966).

*Primary Examiner*—Alvin E. Tanenholtz
*Attorney, Agent, or Firm*—Wolder & Gross

[57] ABSTRACT

The present invention is concerned with a process for producing L-arginine by fermentation, characterized by culturing an L-arginine producing mutant strain derived from the coryneform glutamic acid-producing bacteria in a nutrient medium to accumulate L-arginine and recovering L-arginine therefrom.

4 Claims, No Drawings

PROCESS FOR PRODUCING L-ARGININE BY FERMENTATION

RELATED APPLICATION

The present application is a continuation-in-part of Ser. No. 119,348, filed Feb. 26, 1971 in the name of the present inventors and now abandoned.

SUMMARY OF INVENTION

L-arginine has conventionally only been produced by synthesis, and its direct production of fermentation has never been reported in the art. As a result of extensive studies in the production of L-arginine by fermentation, it has now been discovered that a substantial amount of L-arginine can be accumulated by fermentation using L-arginine producing mutant strains derived from the coryneform glutamic acid-producing bacteria (such as, for example, *Corynebacterium glutamicum*). The coryneform glutamic acid-producing bacteria is sometimes classified into Brevibacterium, Corynebacterium, Micrococcus, Microbacterium, Arthrobacter or Azotobacter and which forms a taxonomically closely related group to bacteria described in Abe et al. of J. General and Applied Microbiology, Vol. 13, pp. 279–301 (1967). Said mutant strains capable of producing significant amounts of L-arginine are generally characterized as those being resistant to L-arginine-analogues (e.g. canavanine, homoarginine, etc.) so that the latter can be regarded as typical strains for the purpose of the present invention. However, there are some mutant strains capable of producing large amounts of L-arginine although their gene mutations, except their L-arginine productivity, have not yet been clarified.

The preferred microorganisms for use in the present invention are mutant strains of *Corynebacterium glutamicum*, the particularly preferred mutant strain being *Corynebacterium glutamicum* ATCC 21659 and *Corynebacterium glutamicum* ATCC 21831.

Either synthetic or natural medium can be used for the process of the present invention so long as it contains preferable amounts of carbon sources, nitrogen sources, inorganic salts and small amounts of nutrients required for the growth of the strains used, as is shown in the example. There is no further limitation as to the composition of the medium.

As the carbon source, various carbohydrates such as glucose, fructose, sucrose, maltose, mannose, starch, starch hydrolyzate, mollasses, etc. or various organic acids such as pyruvic acid, fumaric acid, lactic acid, acetic acid, etc. can preferably be used. These substances may be used either single or in combination.

As the nitrogen sources, various conventional sources are suitable, such as ammonia, various inorganic and organic ammonium salts, e.g., ammonium chloride, ammonium sulfate, ammonium carbonate, ammonium acetate, etc. or other nitrogen containing compounds, e.g., urea. Additionally usable are nitrogenous organic materials such as peptone, NZ-amine (casein hydrolyzate), meat extract, yeast extract, corn steep liquor, casein hydrolyzate, fish meal or its digest, defatted soybean meal or its digest, chrysalis hydrolyzate, etc.

As the inorganic substances, potassium monohydrogen phosphate, potassium dihydrogen phosphate, magnesium sulfate, sodium chloride, ferrous sulfate, manganese sulfate, calcium carbonate, etc. can preferably be used.

When the strain used requires trace amounts of various nutrients such as vitamines, amino acids, purine or pyrimidine bases, etc. for growth, such nutrients should also be added. However, there is no need to separately add these nutrients when they are already contained in other ingredients mentioned above. Such nutrients include, for example, amino acids such as aspartic acid, methionine, etc., vitamines such as biotin, thiamine, cobalamine, etc., purine or pyrimidine bases such as adenine, guamine, uracil, thymine, cytosine, etc.

The strain is cultured under aerobic conditions by conventional techniques, for example, by shaking, submerged culturing with aeration and agitation, etc. The culturing temperature is, in general, preferably from 20°C to 40°C. During the culturing, the pH of the medium is preferably kept at about neutrality to obtain a high yield. Normally it is maintained at a pH of 4 to 9. However, these temperature and pH conditions are not essential for carrying out the main propagation. It is usually sufficient to culture the strain for 1 to 5 days to accumulate a substantial amount of L-arginine in the medium.

After the completion of the culturing, L-arginine is recovered from the fermented liquor by means of suitable conventional methods, such as the ion exchange resin treatment, or precipitation.

The strains described in the present specification are on deposit with the American Type Culture Collection and are freely available to the public.

The following non-limitative examples illustrate the invention.

Example 1

An L-arginine-producing strain (ATCC 21659) (canavanine resistant) obtained from *Corynebacterium glutamicum* (synonym of Micrococcus glutamicus) ATCC 13032 by mutation treatment was used. This strain was cultured with shaking in a seed medium having a composition of 2 percent glucose, 1 percent peptone, 1 percent yeast extract and 0.3 percent NaCl for 24 hours at 30°C. One ml of the resultant seed culture was inoculated into 10 ml of a fermentation medium in a 250 ml Erlenmeyer flask, and cultured with shaking at 30°C for 72 hours to obtain 5.1 mg/ml of L-arginine in the culture liquor. The composition of the fermentation medium used was as follows:

| | | | |
|---|---|---|---|
| Glucose | 10% | $K_2HPO_4$ | 0.05% |
| $KH_2PO_4$ | 0.05% | $(NH_4)_2SO_4$ | 3% |
| $MgSO_4.7H_2O$ | 0.025% | $FeSO_4.7H_2O$ | 0.001% |
| $MnSO_4.4H_2O$ | 0.001% | Nz-amine | 0.5% |
| Biotin | 50 g/l | Thiamine hydrochloride | 2 mg/l |
| $CaCO_3$ | 2% | | |

After the removal of microbial cells and $CaCO_3$ from the fermented liquor, L-arginine contained in the liquor was recovered as hydrochloride by using weak cation exchange resin. The yield was 3.8 g (hydrochloride) per one liter of the fermented liquor.

Example 2

As the seed culture, an L-arginine-producing strain (canavanine resistant) of *Corynebacterium glutamicum* ATCC 21831 was used. This strain was cultured with shaking in a seed medium (composition: 2% glucose, 2% peptone, 0.15% $K_2HPO_4$, 0.05% $KH_2PO_4$, 0.05% $MgSO_4 \cdot 7H_2O$, 50 g/l biotin and 1% yeast extract) at 30°C for 24 hours. One ml of the resultant seed culture was inoculated into 10 ml of a fermentation medium in a 250 ml Erlenmeyer flask and was cultured with shaking at 30°C for 72 hours. The composition of the used fermentation medium was as follows:

Cane molasses - 15 percent (calculated as glucose)

Soybean meal hydrolyzate (decomposed with 6N $H_2SO_4$ and neutralized with aqueous ammonia) - 2 percent (calculated as soybean meal)

Urea - 0.3%

$K_2HPO_4$ - 0.07%

$MgSO_4 \cdot 7H_2O$ - 0.05%

$CaCO_3$ - 3%

The pH of the used fermentation medium was adjusted to 7.2. The amount of L-arginine produced in the cultured liquor was 17.7 mg/ml.

What is claimed is:

1. A process for producing L-arginine which comprises culturing *Corynebacterium glutamicum* ATCC 21659 in a nutrient medium containing a carbon source, nitrogen source and inorganic salts to accumulate L-arginine, and recovering the accumulated L-arginine therefrom.

2. The process of claim 1 wherein culturing is carried out aerobically in an aqueous nutrient medium at a temperature from about 20°C to 40°C and at a pH from about 4 to 9.

3. A process for producing L-arginine which comprieses culturing *Corynebacterium glutamicum* ATCC 21831 in a nutrient medium containing a carbon source, nitrogen source and inorganic salts to accumulate L-arginine, and recovering the accumulated L-arginine therefrom.

4. The process of claim 3 wherein culturing is carried out in an aqueous nutrient medium at a temperature from about 20° to 40° C. and at a pH from about 4 to 9.

* * * * *